Dec. 7, 1954    J. HREBICEK    2,696,108
BALANCING MACHINE
Filed Jan. 12, 1951    3 Sheets-Sheet 1

Inventor
James Hrebicek
by John F. Brezina
Atty.

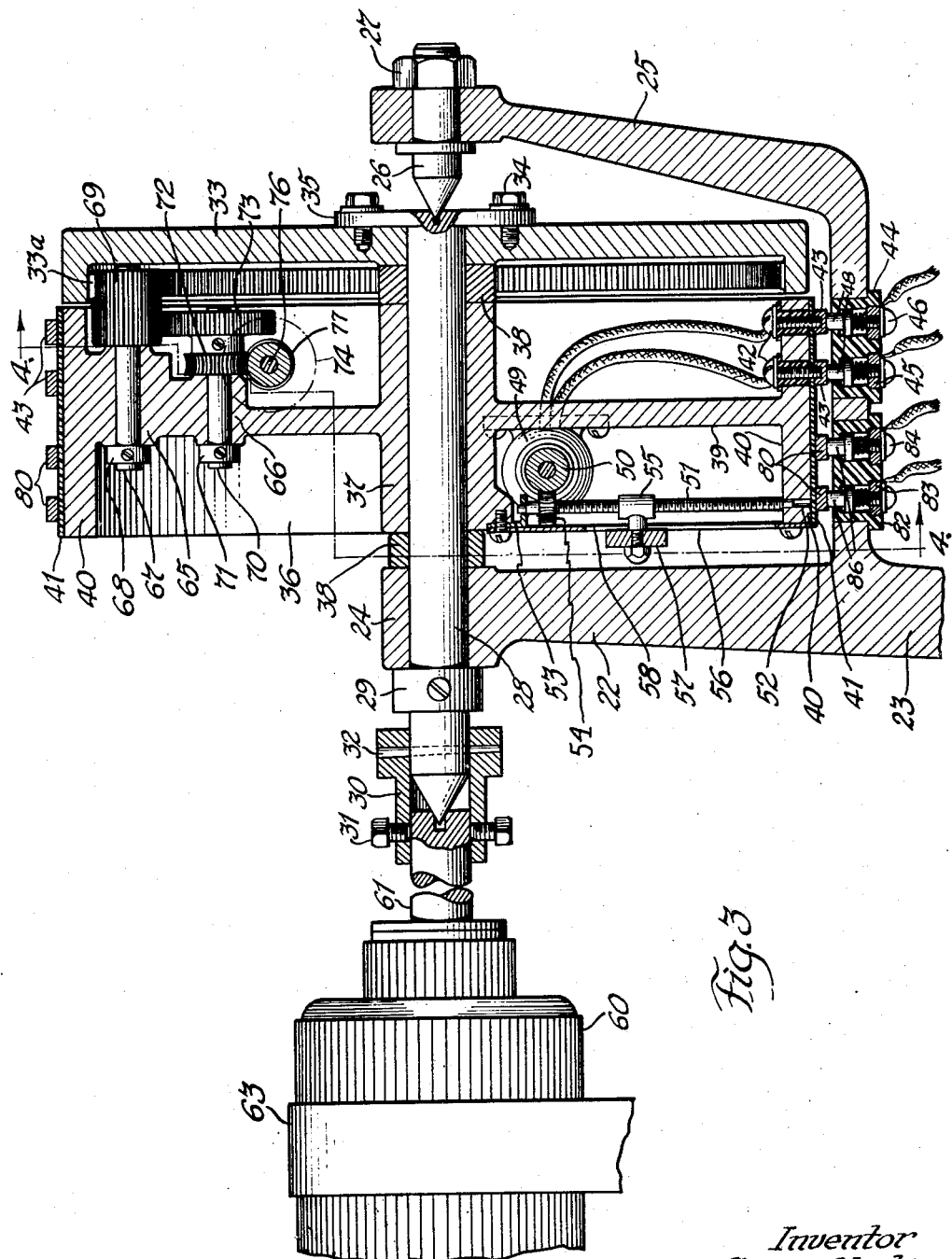

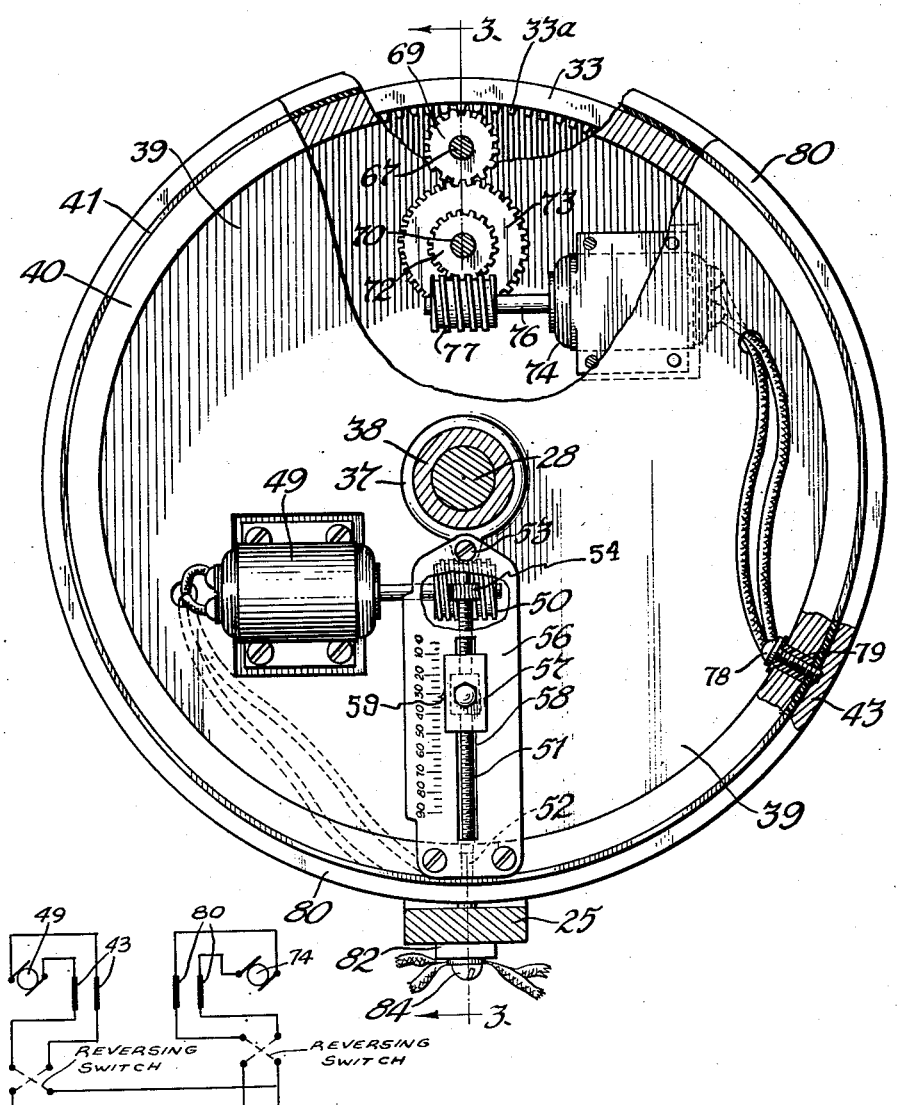

United States Patent Office 2,696,108
Patented Dec. 7, 1954

2,696,108

BALANCING MACHINE

James Hrebicek, Cicero, Ill.

Application January 12, 1951, Serial No. 205,673

6 Claims. (Cl. 73—66)

My invention is directed to novel balancing machines which are adapted for use in determining unbalance and overweight in rotors, rotatable objects, and various manufactured mechanical and structural parts whose normal operation and functions require that they be correctly balanced, and further in determining the weight and extent of the located cause of unbalance so that the manufactured part may be corrected for perfect balance. In other words, my invention permits the ascertainment of how large the cause of unbalance (or heavy part) is, as well as its location, this during the rapid rotation of the manufactured part and without the necessity of stopping my machine until both the location and overweight of the heavy portion causing the unbalance has been ascertained.

It is to be understood that when the location and weight or extent of the unbalance is ascertained, such part of the over-heavy portion of the object is either removed by grinding, shaving or other mechanical processes, or that the operator will add, on the diametrically opposite side and correspondingly distanced from the axis to the over-heavy part, additional metal, as by welding, to the extent and weight equal to the overweight previously ascertained.

In the test for unbalance of rotors, armatures, cylinders, wheels and the like, presently known equipment has provided for the rapid rotation of the part on supporting journals which supports were flexible to a limited extent so that as the speed of rotation is increased, either or both of journal supported members would vibrate according to the locations of one or more areas of unbalance of the part being tested. A relatively upwardly extending vibrating spring or metal indicator was visually observed to indicate approximate extent of and the approximate location of the overweight, though such did not indicate to the operator any more than near which end of the tested object the overweight existed.

Further, the previously known machines for such testing have been of such type as to require the testing operator to repeatedly stop the rotation of the work being tested, and after each stop, to add or move a weight or the like a short distance in the supposed direction diametrically opposite to the heavy part; then again rotate the object at high speed, again observe the vibration indicator, and again and repeatedly stop the object, move the weight, then rotate at high speed, and continue to repeat such series of steps until he had secured the "counterweight" correctly in a diametrically opposite line or path to the center of the over-weight part. He then had to go through a similar series of rapid rotations of the work during vibration observations, and move a weight radially and in a direction away from the axis and diametrically opposite to the location of the overweight. These repeated operational steps (which included the many intervals of waiting time for the part to stop moving) required a considerable amount of time and this has resulted in a relatively large amount of consumed labor time and labor cost to accomplish the tests aforesaid.

It is an important object and accomplishment of my invention to provide a novel machine and method of testing, measuring and locating unbalance in manufactured parts in one continuous uninterrupted operation and without the necessity of repeatedly stopping the rapidly rotating part and repeating the trial and error steps, and thereby locating, both diametrically and radially, the center of the overweight and also measuring the extent or weight of the overweight.

It is an important object of my invention to provide a novel machine for quickly and easily determining the location and weight of unbalance which has a manually controllable electrically driven mechanism in the rotative head (which is normally connected to rotate with the work being tested) for moving a movable weight circumferentially to locate the correct radial line or path diametrically opposite to the center of overweight of the work tested, and which has a manually controllable and adjustable electrically driven mechanism in said rotatable head, selectively operable during test rotation, for moving a movable weight on said head radially, either inward or outward from the axis, to thereby position such weight at the right distance from the axis to correctly counterbalance the over-heavy part, thus thereby locating the center of the heavy part radially.

A further object and accomplishment of my invention is the provision of a novel machine for correctly and easily locating the area of unbalance of manufactured parts and of measuring the degree, extent and weight thereof, and which machine includes means for releasably and rotatably mounting the work to be tested in axial alignment with a rotatable head which is adapted to be selectively driven by power means, said head including and providing an annular housing having a plurality of rings mounted therein; having an electrically driven motor and reduction gear means therein, said motor being adapted to receive its electrical power conducted partially through said rings from a power source, and said gear means being adapted to move, in either direction of rotation, the said head. A slidably mounted weight is carried by the head so that the operator may easily and quickly change the positions of said weight circumferentially and arcuately in relation to the axis of rotation of said head and in relation to the heavy part of the work being tested and to thereby position said weight in a radial path diametrically opposite to the overweight part of the tested work.

A further object of my invention is the provision of a machine of the described class having a power-drivable rotatable head, rotatable coaxially with the work being tested, and which carries a second electrically driven gear mechanism and motor therefor, and a slidably mounted counter-weight element adapted to move radially with respect to the axis of said head and wherein said weight is operatively connected to said gear mechanism so that the selective rotation, controlled by the operator, of said motor and gear mechanism will move the counterweight radially in either direction and during the rotation or spinning of the head and of the tested work, so that the extent or weight of the overheavy unbalancing part of the tested work may be measured and located as to distance from the axis of rotation of said work and of said head, all without stopping or interrupting the test rotation of the work and without successive manual repositioning of said counterweight.

A further object and accomplishment of my invention is the provision of a dynamic testing machine for testing the unbalance of manufactured parts and locating and measuring same and which includes electrically driven selectively controlled mechanism for shifting rotatably rotatable head member, in relation to the main work being tested to determine circumferentially the location of the overweight part, and which includes electrically driven selectively controlled mechanism for moving radially a slidably mounted counterweight on said head member to thereby locate radially and to measure the overweight creating the unbalance, all the foregoing being selectively controlled and performed by the operator without stopping the rotation of the tested work and of said rotatable head.

Other and further objects of my invention will be apparent from the following description and appended claims.

On the drawings:

Fig. 3 is an enlarged cross section on a vertical plane as indicated by the line 3—3 of Fig. 4.

Fig. 4 is a cross sectional view broken on an irregular plane indicated substanitally by the line 4—4 of Fig. 3.

Fig. 5 is a simple circuit diagram showing the reversing switches connected to the respective motors.

As shown on the drawings:

Figure 1:
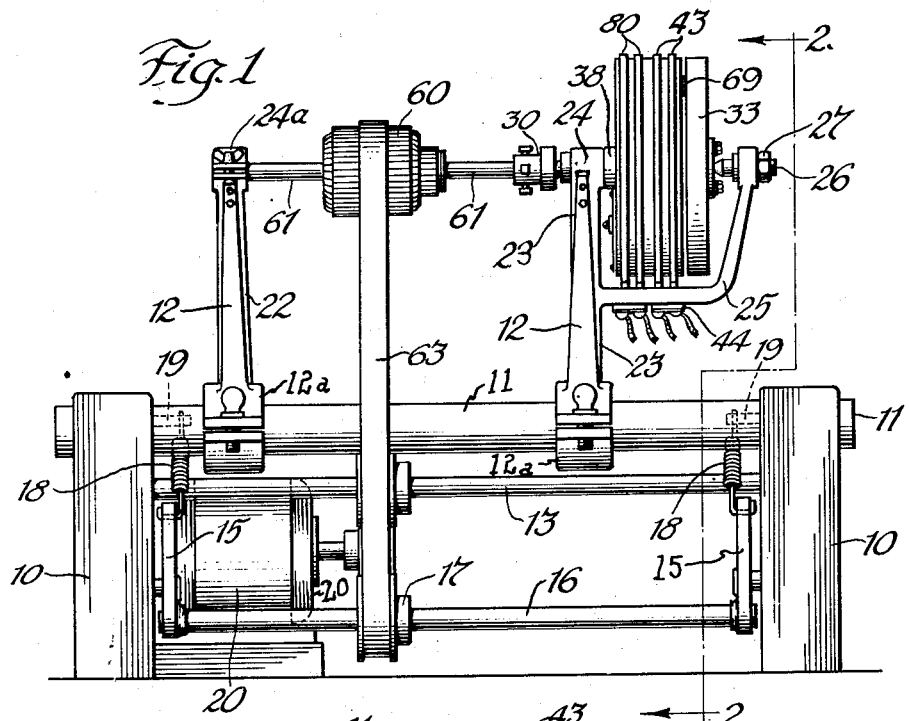
Fig. 1 is an elevational view of a testing machine which embodies the novel construction of my invention and which illustrates an armature mounted for rotation in the machine as the work being tested.

Referring to Fig. 1, numeral 10 designates the end standards of a suitable machine frame, which standards are connected by a pair of spaced apart horizontal connecting shafts 11. A pair of upwardly extending adjustable journalling arms or members 12 are releasably clamped or equivalently secured in spaced apart position on each of said shafts 11, for example by yieldable clamps 12a which are releasable or securable by rotations of hand screws 12b, as illustrated in Figs. 1 and 2, and so that the spacing thereof may be adjusted according to the requirement of the particular work.

Figure 2:
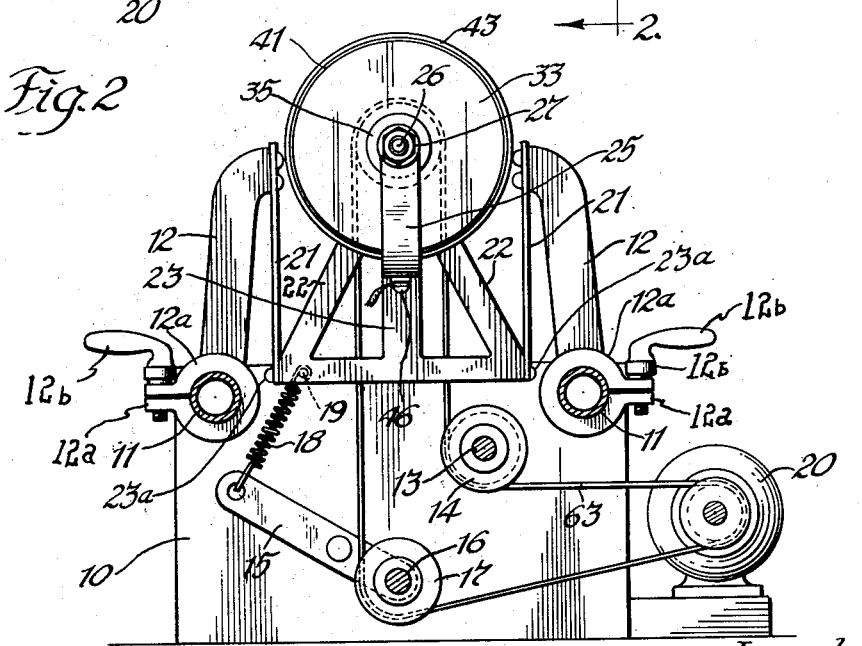
Fig. 2 is an end elevation thereof and looking at the right hand end of Fig. 1.

As illustrated in Figs. 1 and 2, a horizontal shaft 13 is journalled at its end with respect to said end standards 10 and has mounted thereon a pulley 14. Numeral 15 designates a pair of levers which are pivoted intermediate their ends to the frame standards 10 respectively, and substantially adjacent the inner faces thereof, by means of a bolt passing through each thereof. The normally lower free ends of said levers 15 carry and have journalled therein a horizontal shaft 16, and a suitable pulley 17 is mounted. The opposite ends respectively of said levers 15 are apertured and each lever has anchored thereto one end of a spring 18. The opposite ends of springs 18 are anchored to suitable stationary parts of end standards respectively, such as studs 19 shown in dotted lines in Fig. 1. It will be understood that said springs 18 normally pull levers 15 in a clockwise direction looking at Fig. 2, to keep taut the drive belt hereinafter described. Numeral 20 designates an electric motor suitably powered which may be in any one of various positions, though hose pulley is preferably in alignment with pulleys 14 and 17. Four depending relatively thin metal hangers or links 21, and which have a reasonable degree of flexibility, have one end of each thereof connected by suitable screws to upper ends of one of the adjustably mounted holding and supporting arms 12, by means of suitable screws, as illustrated in Fig. 2.

A pair of substantially triangular metal standards or supporting frames 22 is connected at the base portions to the lower ends of flexible links 21 by screws 23, one of said frames 22 being suspended on the two links 21 at one end of the machine and the other of said frames 22 being suspended by the other of said two links 21. Each of said frames 22 has a central vertically extending journalling standard 23 and said standards have a journalling bearing 24 and 24a respectively, said bearings each having a horizontally extending bearing passage.

Referring to Figs. 1 and 3, the suspended frame 22 and its center member 23 carry an angularly formed journalling bracket or arm 25 whose upper apertured portion carries and has mounted therein, a pointed and flanged stub shaft or centering pin 26 which is secured in desired horizontal position by a nut 27, as shown in Figs. 1 and 3.

Referring to Fig. 3, a shaft 28 is journalled in bearing 24 and its opposite end (shown at the right of Fig. 3) has secured thereto as by welding, a centrally recessed apertured bearing plate 35 shown partly broken away in Fig. 3. A thrust collar 29 is secured on the projecting end of shaft 28 adjacent bearing 24. The projecting end of shaft 28 is cone shaped and has securely mounted therein a passaged coupling 30 by means of a cross pin 32. A pair of releasable set screws 31 are adjustably threaded in the coupling 30 and are adapted to releasably engage and hold the end part or shaft of the work being tested.

Referring to Fig. 3, numeral 33 designates a metal ring gear which is secured by bolts or screws 34 to plate 35 and its gear teeth 33a are carried by and extended inwardly from the peripheral flange of said ring gear 33.

A peripherally flanged metal rotor or rotatable member 36 having a passaged hub 37 is journalled on shaft 28, and a pair of spacers 38 are interposed between the opposite ends of hub 37 and ring gear 33 and bearing 24 respectively. Said rotor 36 includes an integral central radially extending rib 39 which connects the peripheral circumferential member 40 with hub 37. A ring 41 of insulating material is suitably mounted about the peripheral member 40 of rotor 36.

As shown in the lower portion of Fig. 3, the member 40 has two spaced apertures formed therein, in which are mounted two terminal screws 42. A pair of metal rings 43 of electrically conductive metal are secured tightly in spaced apart though parallel relation on ring 41 of rotor 36. Said rings 43 have threaded recesses and the ends of terminal screws 42 are threaded thereinto.

Arm or bracket 25 has two spaced apart vertically extending passages therein as indicated at the lower part of Fig. 3, and an enlarged apertured and passaged member 44 of non-conductive material is mounted in one of said passages. A metal plug 45 having a threaded aperture is mounted in each of the two passages of said member 44. Terminal screws 46 are threaded in said plugs 45 respectively and the inner ends of said screws 46 are secured to the end portions of two depressible springs 47 respectively. Slidably mounted in the passages of said member 44 are the flanged portions of plungers or contact members 48 whose normally projecting ends slidably engage the annular faces respectively of the conducting rings 43.

It will be understood that during rotation of the rotor the terminal screws 46 and the terminal screws 42, respectively, are continually connected electrically to each other.

Mounted on one face of the rib 39 of rotor 36 is a small reversible electric motor 49, as illustrated in Fig. 3. The motor 49 is connected to the terminal screws 42 by means of a pair of circuit wires. A conventional reversing switch is interposed in the circuit wires leading from the screws 46 to a power source. The projecting armature shaft of said motor carries a worm gear 50. An externally threaded shaft or worm 51 has one reduced end journalled in bearing passage 52 formed in member 40 of rotor 36, and said shaft has its opposite end reduced and journalled in the apertured arm of an angular mounting bracket 53, said bracket 53 being secured by a screw to the hub 37 of rotor 36. A worm gear 54 is secured on shaft 51 in a position to mesh with and be driven by worm 50.

An internally threaded sleeve-like member 55 threadingly engages shaft 51 so that rotation of said shaft will cause said member 55 to move radially with respect to said rotor. Secured on member 40 of rotor 36 and on the laterally extending flanged portion of member 40 of rotor 37, is an indicia-bearing rule or gauge 56, which is secured by plurality of screws at its opposite ends substantially as indicated in Fig. 4. The gauge 56 has uniformly spaced graduations thereon which represent various radial distances from the rotational axis of the rotor 36. The longitudinal slot of gauge 56 is designated as 58. The projecting end portion of member 55 is threaded and extends through the slot of said indicia-bearing plate and has removably mounted thereon by means of a nut, a counterweight 57 of known weight. Said counterweight has an integral pointer 59, as illustrated in Fig. 4, adapted to co-operate with the graduations of the gauge 56 to indicate the radial position of the weight 57 with respect to the rotational axis of the rotor 36. It will be understood that rotation of said motor 49 in one direction will cause movement of said member 55 and counterweight 57 and pointer 59 inward and in a radial path, and that opposite rotation of said motor will cause movement of said counterweight and pointer in the opposite outward radial direction within the limits of the slot 58 to display to the operator the weight of the overheavy part on the indicator graduations.

While the object, articles of manufacture or machine part or components may vary in a wide range, in the drawings herein I have illustrated a motor armature as the "work" being tested and measured for proper balance. Such armature is designated by numeral 60 and the axial shaft thereof as numeral 61. Said shaft projecting substantially in opposite direction from said armature as illustrated in Fig. 1. In Fig. 3 only a fragment of said armature is illustrated and one end portion of the shaft 61 is broken away. One end of the shaft 61 is drilled to provide a central end recess, and the cone-shaped end of the shaft 28 is inserted therein, the opposite end of the armature shaft 61 being releasably journalled in the releasable bearing 24a. It will be understood that the lower bearing of the mounting arms 12 comprise slightly expandable and contractable clamping elements 12a, which are, when released, slidable longitudinal on the shafts 11 respectively and which are securable in any desired position and distance from the other two arms 12 according to the length and dimension of the work being tested. Said clamping elements illustrated in Fig. 1 and Fig. 2 are adapted to be contracted and secured in desired position by means of handle-bearing threaded screws which threadingly engage the lower ear portions of said clamping elements to selectively secure said clamps on shafts 11 respectively and to release same to permit longitudinal slidable movement thereof.

It will be understood that by the aforesaid described means, the work to be tested of whatever length, within reasonable limits may be mounted for rotation as aforesaid and coaxially with the axis of shaft 28 and with the axis of ring gear 33. A flexible belt 63 is removably mounted about the pulley 14 of motor 20 and engages below the pulley 14, thence over the armature or other "work" 60 and engagement with the belt-tightening pulley 17 in the manner illustrated in Figs. 1 and 2. The electric motor 20 is connected by conventional circuit wires to a conventional manually reversing switch (not shown) so that the operator may selectively and rapidly rotate the armature 60 or other work being tested, the rotation of the latter being effected through the transmission belt 63. The relatively high speed rotation of the work being tested will, if such work is out of balance even to the slightest degree, cause a back and forth swinging and vibration of the depending suspension links 21, said links having a reasonable degree of flexibility as aforesaid. The operator will observe said suspension links 21 and upon seeing that there is an unbalance in the work being tested, will then proceed to locate and to measure the extent of such unbalance, this being described hereinafter.

I will now describe the novel means and mechanism for substantially determining the location of the unbalance.

Referring to Fig. 3, the central rib 39 of rotor 36 has substantially adjacent the member 40, a pair of integrally formed transversely passaged bosses 65 and 66, whose passages are spaced radially with respect to the axis of rotor. Journalled in the passage of boss 65 is a short shaft 67 having a retaining collar 68 secured thereon, and at opposite end of said shaft 67 has securely mounted thereon a gear 69 which is in mesh with the inwardly directed teeth 33a of the ring gear 33.

Mounted in the passage of the inner boss 66 is a stub shaft 70 having a retaining collar 71. Mounted on the projecting end portion of shaft 70 is a worm gear 72 and a larger gear 73, said gears preferably being made integral as indicated in Fig. 3. Gear 73 is in mesh with one end portion of gear 69 as shown in Figs. 3 and 4.

Referring to Fig. 4, numeral 74 designates a small reversible type electric motor whose apertured base is secured by a plurality of rivets or bolts 75 to the vertical face of the rib 39 of the rotor 36. Said motor has a projecting shaft 76 on which is mounted a worm 77, said worm being in mesh with the gear 72 so as to selectively rotate gear 73, shaft 70 and operatively connected parts.

Said motor 74 is connected by a pair of conventional circuit wires to a pair of terminal screws 78 (one of which is shown in Fig. 4), said terminal screws being mounted within non-conductive insulating sleeve 79 respectively and the ends of said screws threadingly engaging threaded apertures of conductive contact rings 80 respectively, one of said rings being illustrated in side elevation of Fig. 4 and both thereof being illustrated in cross section in lower part of Fig. 3. Said contact rings are securely mounted in spaced apart relation about the sleeve 41 and member 40 of rotor 36.

As illustrated in Fig. 3, a receptacle-like fitting 82 having two spaced apart passages therein, has mounted therein a pair of internally threaded plugs or nuts 83 mounted therein in which are threaded a pair of terminal screws 84 respectively. The inner end of said screws 84 are connected to springs 85 respectively, and the inner ends of said springs 85 are conductively secured to metal contact elements or plugs 86 whose end portions project inward of the inner face of the bracket 53 and slidably engage the outer faces of the metal rings 80 respectively. Terminal screws 84 are connected by standard circuit wires to a manually controlled reversible switch (not shown), said switch being connected in a conventional manner to an electric power source.

It will be understood that by the aforedescribed means, the operator will selectively control, stop, start, and rotate in either direction the motor 74 to in turn transmit selected rotative movement in the desired direction of the shaft 67, gear 69 and also effect rotation of the rotor 36 and parts carried thereby, in relation to the ring gear 33 and that such independent and relative rotation of said rotor will be selectively effected during the spinning rotation of both said ring gears, said rotor, and said work being tested.

A typical test operation is as follows: The operator will mount the work, such as armature 60 with shaft 61, or other work to be tested in the manner described, to be rotated co-axially with shaft 28. The operator will close the circuit to operate motor 20 to in turn rapidly rotate the mounted work, the operator having first set the counterweight 57 at zero position, in which position it does not act as a counterweight. If no vibration is observed in the work or in the suspended frames or the members 21, this proves that the work is properly balanced and has no unbalance. If during such rotation vibration of the work and of the suspended frames, or of a conventional attached vibration indicator is observed, the operator will first throw the switch to operate motor 49 to thereby move the counterweight 57 a short distance radially and outwardly away from zero position. Further, the operator will then disconnect the circuit to stop motor 49 and will thereupon close the control switch to close the circuit to motor 74, to thereby rotate the rotor 40 with respect to the ring gear 33 and the work being tested and thus the counterweight 57 will be moved, along with the rotor, first in one direction and then in the opposite direction in an arcuate path co-axial with the common axis of the shaft 28 and of the work being tested.

By thereby moving the counterweight in such an arcuate path in one direction during continuous observance of the extent of vibration, the operator can ascertain and position the center of gravity of the counterweight in a position diametrically opposite to the center of gravity of the overheavy part of the work being tested, this because when he has by such circumferential movement of said counterweight, positioned said counterweight to a point where it is diametrically opposite to the overheavy part of the work, the vibration of the work being tested and of the aforesaid vibration-indicating parts will cease, or be at an observed minimum.

Having located thereby the center of gravity of the overheavy part of the work, the operator will, without stopping the continued rotation of the work and of the rotor and attached parts, proceed to measure the weight of the overheavy part of the work. This the operator accomplishes by again throwing the manual control switch to close the circuit to operate motor 49 to first move the counterweight 57 in one direction, the operator continuing observance of the extent of vibration, and if he notes that the vibration of the work is not eliminated by movement of the counterweight 57 in one direction, the operator will then reverse the direction of motor 49 to move the counterweight in the opposite direction slowly, continuing observance of the work being tested and the extent of vibration thereof. The operator, by said last mentioned step, will reach a point where he has moved the counterweight in a radial path to a point to correctly counter-balance and equal the weight of the overheavy part of the work. Thereupon, by reading his indicator, the weight units of which are known, he has ascertained the weight of the over-heavy part of the work and knows how much and in what position he must add weight to the work to correctly counter-balance the overheavy part, or he may optionally remove in most cases as much of the metal from the area of the overheavy part as is necessary to place the work into proper balance. After he has either removed a part of the work, as aforesaid, or added weight to a point diametrically opposite to the overheavy part, he can then repeat the aforesaid tests and ascertain that the work has been placed into properly balanced condition.

The foregoing series of steps by which the operator (first) tests whether or not there is any unbalance, (second) locating the center point of the overheavy part of the work, (and third) measuring the weight of the overheavy part of the work being tested, all are performed continuously and without stopping the rotation of the work being tested, this resulting in a great saving of time and labor.

My invention has great advantages, especially in that the overheavy part as well as the weight of the overheavy part may be determined during one continuous cycle of rotation of the work being tested, and this results in the said tests being correctly accomplished by a small fraction of time which has been required in testing unbalance on presently known machines and equipment. As aforesaid in previously known unbalance testing machines, it has been necessary to many times and repeatedly stop and restart the rotation of the tested work and during the intervals between such intermittent rotation cycles, the operator has had to manually move a weight a little at a time and by repeated trial and error, and repeated stopping and starting of the movement of the work, reposition such counterweight in different positions and between each repositioning operation of the counterweight, to stop rotation of the work being tested.

As many changes could be made in the above construction, and as many apparently widely different embodiments of my invention within the scope of the claims could be constructed without departing from the spirit and scope thereof, it is intended that all matter contained in the accompanying specification shall be interpreted as illustrative and not in a limiting sense.

I claim:

1. In a machine for determining the location of and measuring the unbalance of manufactured parts, a support; a frame flexibly suspended by said support; a spindle shaft journalled in said frame, said spindle shaft having quick detachable means at one end thereof for interconnecting the manufactured part to be tested and the spindle shaft whereby they are capable of rotating as a unit; an internal ring gear secured to the opposite end of said spindle shaft; a rotor journalled on said spindle shaft; means for drivingly connecting said ring gear and rotor together whereby they are constrained against relative rotation with respect to each other, said means including a planet gear journalled on said rotor meshing with said ring gear at a point radially spaced from the rotational axis of said rotor and adjacent the periphery of said rotor, said planet gear being constrained from rotating about its own axis; means for selectively rotating said planet gear about its own axis with respect to said ring gear to rotate said rotor with respect to said ring gear, said means including an electric motor mounted on said rotor and operatively connected to said planet gear, a pair of electrically conductive contact rings disposed about the periphery of said rotor, conductors electrically connecting said electric motor and said rings, and a pair of contact elements mounted on said frame spring-pressed into sliding engagement with said rings, said contact elements being connected to an electric power source whereby said electric motor is energizable during continued rotation of said spindle shaft, ring gear, and rotor; an externally threaded shaft mounted on said rotor for rotation about an axis normal to the rotational axis of said spindle shaft; a radially movable counterweight mounting member threadingly engaging said threaded shaft; a counterweight carried by said mounting member; means to selectively rotate said threaded shaft to move said counterweight in a radial path radially disposed entirely between the rotational axis of said rotor and the outer periphery of said rotor to thereby selectively position said counterweight to counterbalance an overheavy portion of the manufactured part, said counterweight being movable during continued rotation of said rotor and spindle shaft, said last-named means including a second electric motor mounted on said rotor, gear-reduction mechanism operatively connecting said motor and said threaded shaft, a second pair of electrically conductive contact rings disposed about the periphery of said rotor, conductors electrically connecting said second electric motor and said second pair of rings, and a pair of contact elements mounted on said frame spring-pressed into sliding engagement with said second pair of rings, said contact elements being connected to an electric power source.

2. In a machine for determining the location of and measuring the unbalance of manufactured work; a support; a frame flexibly suspended by said support; a spindle shaft rotatably journalled in said frame; quick detachable means for connecting said spindle shaft to said manufactured work for rotation together; an internal ring gear secured to said shaft; a rotor journalled on said shaft; means for rotating said rotor from said ring gear comprising a planet gear journalled on said rotor meshing with said ring gear at a point radially spaced from the rotational axis of said rotor and adjacent the periphery of said rotor and a worm pinion mounted on said rotor drivingly connected to said planet gear, the thread pitch of the worm pinion being such as to preclude rotation and of said planet gear about its own axis by said ring gear; means for selectively rotating said worm pinion for rotating said planet gear about its own axis to rotate said rotor with respect to said ring gear including an electric motor, mounted on said rotor, and means for electrically connecting said motor to a power source and maintaining such connection during rotation of said rotor, said electrical connection means including a pair of metal rings secured to said rotor exteriorly thereof and contact elements carried by said frame slidably engaging said rings respectively; a radially disposed worm journalled on said rotor; a counterweight having an operative connection with said worm whereby rotation of said worm will move said counterweight radially inwardly or outwardly along a radial path radially disposed entirely between the rotational axis of said rotor and the outer periphery of said rotor; means for selectively rotating said worm to move said counterweight radially including a second electric motor mounted on said rotor and means for electrically connecting said second motor to a power source and maintaining such connection during rotation of said rotor, said last-named electrical connection means including a second pair of rings secured to said rotor exteriorly thereof and contact elements carried by said frame slidably engaging said second pair of rings, respectively.

3. In a machine for determining the location of and measuring the unbalance of manufactured parts; a support; a frame flexibly suspended by said support; a spindle shaft journalled in said frame having quick detachable means at one end thereof for interconnecting the manufactured part to be tested and the spindle shaft whereby they are capable of rotating as a unit; a ring gear secured to the opposite end of said spindle shaft; a rotor journalled on said spindle shaft; means for drivingly connecting said ring gear and rotor together whereby they are constrained against relative rotation with respect to each other, said means including a planet gear journalled on said rotor meshing with said ring gear at a point radially spaced from the rotational axis of said rotor and adjacent the periphery of said rotor, said planet gear being constrained from rotating about its own axis; manually controlled power means for selectively rotating said planet gear about its own axis with respect to said ring gear to rotate said rotor with respect to said ring gear during rotation of said spindle shaft; a counterweight supported by said rotor adapted to move in a radial path radially disposed entirely between the rotation axis of said rotor and the outer periphery of said rotor; and manually controlled power means for selectively moving said counterweight radially to selectively position said counterweight to counterbalance an overheavy portion of the manufactured part, said counterbalance movements being affected during continued rotation of said spindle shaft and said manufactured part.

4. The combination as set forth in claim 3, in which said manually controlled power means for selectively rotating said planet gear about its own axis includes an electric motor supported by said rotor and means for electrically connecting said motor to a power source and maintaining such connection during rotation of said rotor.

5. In a machine for determining the location of and measuring the unbalance of manufactured parts; a support; a frame suspended by said support; a spindle shaft journalled in said frame having quick detachable means at one end thereof for interconnecting the manufactured part to be tested and the spindle shaft whereby they are constrained to rotate together; a rotor journalled on said spindle shaft; means for drivingly connecting said spindle shaft and rotor together at a point radially spaced from the rotational axis of said rotor and adjacent the periphery of said rotor whereby they are constrained against relative rotation with respect to each other; manually controlled power means for selectively rotating said rotor with respect to said spindle shaft during rotation of said spindle shaft; a counterweight supported by said rotor adapted to move in a radial path radially disposed between the rotational axis of said rotor and the periphery of said rotor; and manually controlled power means for moving said counterweight radially to selectively position said counterweight to counterbalance an overheavy portion of the manufactured part; said counterweight being positionable during rotation of said spindle shaft and said manufactured part.

6. The combination as set forth in claim 5, in which said manually controlled power means for selectively rotating said rotor with respect to said spindle shaft includes an electric motor supported by said rotor and means for electrically connecting said motor to a power source.

References Cited in the file of this patent

UNITED STATES PATENTS

| Number | Name | Date |
|---|---|---|
| 1,610,487 | Brinton | Dec. 14, 1926 |
| 1,625,259 | Johnson | Apr. 19, 1927 |
| 2,336,429 | Wenger | Dec. 7, 1943 |